(12) United States Patent
Burrell et al.

(10) Patent No.: US 10,701,108 B2
(45) Date of Patent: Jun. 30, 2020

(54) SYSTEM AND METHOD FOR DETERMINING A POLICY IN VIRTUAL DESKTOP INFRASTRUCTURE (VDI)

(71) Applicant: AMZETTA TECHNOLOGIES, LLC, Norcross, GA (US)

(72) Inventors: Brandon Burrell, Suwanee, GA (US); Divya Nettem, Suwanee, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 101 days.

(21) Appl. No.: 15/348,590

(22) Filed: Nov. 10, 2016

(65) Prior Publication Data

US 2018/0131722 A1    May 10, 2018

(51) Int. Cl.
*H04L 29/06*     (2006.01)
*G06F 9/455*     (2018.01)
*G06F 9/451*     (2018.01)

(52) U.S. Cl.
CPC ............. *H04L 63/20* (2013.01); *G06F 9/452* (2018.02); *G06F 9/45558* (2013.01); *H04L 63/083* (2013.01); *H04L 63/0876* (2013.01); *G06F 2009/45587* (2013.01); *G06F 2009/45595* (2013.01)

(58) Field of Classification Search
CPC ... H04L 63/20; H04L 63/083; H04L 63/0876; G06F 9/45558; G06F 2009/45587; G06F 2009/45595
USPC .......................................................... 726/1
See application file for complete search history.

(56) References Cited

U.S. PATENT DOCUMENTS

| | | | |
|---|---|---|---|
| 9,921,860 B1* | 3/2018 | Banga | G06F 9/45533 |
| 2003/0028532 A1* | 2/2003 | Dougu | H04L 63/0236 |
| 2007/0089111 A1* | 4/2007 | Robinson | G06F 21/53 |
| | | | 718/1 |
| 2011/0004680 A1* | 1/2011 | Ryman | H04L 67/025 |
| | | | 709/224 |
| 2012/0096461 A1* | 4/2012 | Goswami | G06F 9/45558 |
| | | | 718/1 |
| 2014/0343989 A1* | 11/2014 | Martini | H04L 63/104 |
| | | | 705/7.17 |
| 2016/0011896 A1* | 1/2016 | Khalid | G06F 9/45558 |
| | | | 718/1 |

(Continued)

*Primary Examiner* — Alexander Lagor
*Assistant Examiner* — Moeen Khan
(74) *Attorney, Agent, or Firm* — Locke Lord LLP; Tim Tingkang Xia, Esq.

(57) ABSTRACT

Systems and methods for determination of a policy in a virtual desktop infrastructure (VDI) system. The system includes a virtual machine (VM) server providing VMs, and a VDI controller connected to the VM server. When the VDI controller receives a login request by a user from a computing device, the VDI controller authenticates the login request, and controls the VM server to assign one of the VMs to the computing device. In doing so, the VDI controller may obtain user information corresponding to the user and device information corresponding to the computing device based on the login request, and retrieve VM information of the VM being assigned to the computing device. Then the VDI controller may determine, from a plurality of policies, a specific policy for the user based on the user information, the device information and the VM information to define permission states of functionalities provided by the VM.

17 Claims, 5 Drawing Sheets

(56) References Cited

U.S. PATENT DOCUMENTS

| | | | | |
|---|---|---|---|---|
| 2016/0065690 A1* | 3/2016 | Hanyu | ................ | G06F 3/0488 |
| | | | | 715/746 |
| 2016/0350148 A1* | 12/2016 | Kitagawa | .............. | H04L 67/306 |
| 2017/0359378 A1* | 12/2017 | Reitsma | .............. | G06F 9/45558 |
| 2018/0054438 A1* | 2/2018 | Li | ........................ | G06F 21/445 |

* cited by examiner

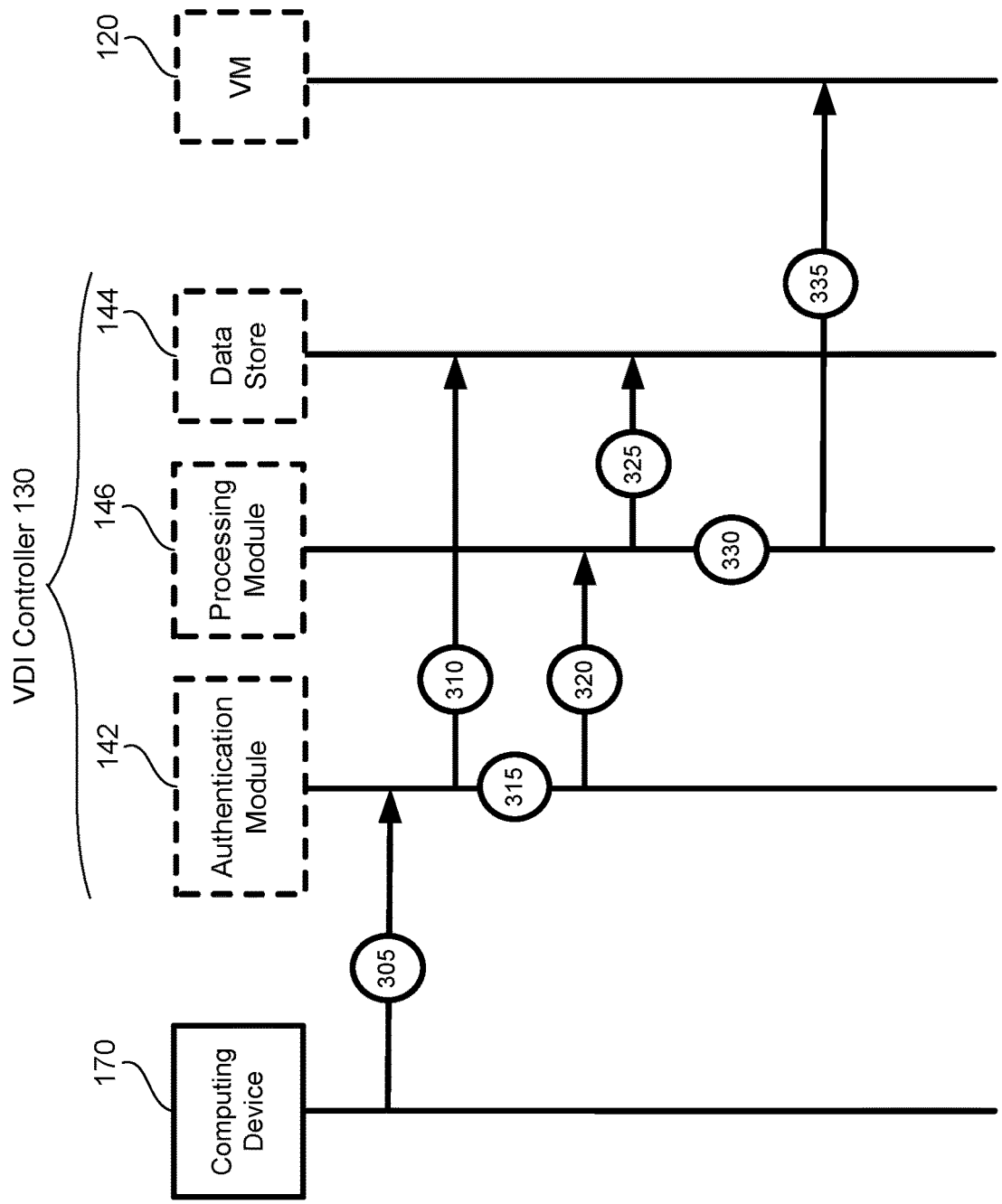

SYSTEM AND METHOD FOR DETERMINING A POLICY IN VIRTUAL DESKTOP INFRASTRUCTURE (VDI)

FIELD

The present disclosure relates generally to virtual desktop infrastructure (VDI) technology, and more particularly to systems and methods of determining a policy in a VDI system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an organization having multiple users having access to computer system operations, each user may be assigned with a privilege, which indicates the level of the user to access the resource of the computer systems, according to the position of the user, safety concerns, or other factors that may be deemed important to the organization. Based on the assigned privileges, the users may be categorized into different groups. For example, in an organization, a group of people may be labeled as privileged users, which include high privileged people such as directors, heads and managers in the organization, and the rest of people in the organization may be ordinary users, such as the officers, engineers and supervisors. Generally, if each user is assigned with a computer, the privileged users will be provided with desktop or laptop computers with higher end hardware configurations, and the performance of these computers used by the privileged users will be much better than that of the ordinary users.

However, in a VDI system, all users are accessing or connecting to the virtual machines (VMs) from their thin client or zero client terminal computers. In this case, resources and corresponding performance of the system will be shared to all of the VMs accessed by the users. Since each VM may be subject to different workload, the sharing process of the resources and performance will be dynamic, thus making it difficult to provide an optimized sharing mechanism for the VDI system based on user privileges.

Therefore, an unaddressed need exists in the art to address the aforementioned deficiencies and inadequacies.

SUMMARY

Certain aspects of the present disclosure relate to a system, including a virtual machine (VM) server providing a plurality of VMs and a virtual desktop infrastructure (VDI) controller communicatively connected to the VM server. In certain embodiments, the VDI controller includes a processor and a non-volatile memory storing computer executable code. The computer executable code, when executed at the processor of the VDI controller, is configured to: receive a login request by a user from a computing device; and in response to receiving the login request, authenticate the login request, and control the VM server to assign one of the VMs to the computing device; obtain, based on the login request, user information corresponding to the user and device information corresponding to the computing device; retrieve, based on the user information, VM information of the VM being assigned to the computing device; and determine, from a plurality of policies, a specific policy for the user based on the user information, the device information and the VM information, wherein each of the plurality of policies defines permission states of a plurality of functionalities provided by the VM.

In certain embodiments, the login request includes a login name and a password of the user.

In certain embodiments, the user information includes a user account or a user identification corresponding to the user.

In certain embodiments, the functionalities provided by the VM include accessibility of audio redirection, USB redirection, modification of display, network, security, and settings of the computing device to which the VM is assigned.

In certain embodiments, the computer executable code is configured to determine the specific policy for the user by: determining, based on the user information, whether the user is an administrator of the system; and in response to determining the user as the administrator, determining an administrator policy having a highest priority as the specific policy for the user.

In certain embodiments, the device information corresponding to the computing device includes an internet protocol (IP) address of the computing device.

In certain embodiments, the computer executable code is configured to determine the specific policy for the user by: determining, based on the IP address of the computing device, whether the computing device is an internal computing device or an external computing device; in response to determining the computing device as the internal computing device, determining the specific policy for the user based on the user information and the VM information; and in response to determining the computing device as the external computing device, determining the specific policy for the user based on the user information, the VM information, and the IP address of the computing device.

In certain embodiments, the internal computing device is a thin client computing device connected to the VM server, and the external computing device is a tablet, a laptop, or a portable device capable of performing redirection to the VM provided by the VM server.

In certain embodiments, the user information further includes group information of the user, wherein the user belongs to at least one of a plurality of pre-defined groups.

In certain embodiments, the computer executable code is configured to determine the specific policy for the user by: determining, based on the group information of the user, whether the user is a multi-group user belonging to a plurality of the pre-defined groups; and in response to determining that the user is the multi-group user, selecting, from the plurality of policies, a plurality of corresponding policies based on the plurality of the pre-defined groups the user belongs to; and determining the specific policy for the user by selecting one of the corresponding policies having a lowest priority as the specific policy.

Certain aspects of the present disclosure relate to a method for determining a policy for a user in a VDI system. In certain embodiments, the method includes: receiving, by a VDI controller, a login request by a user from a computing device; and in response to receiving the login request, authenticating, by the VDI controller, the login request, and controlling a VM server to assign one of a plurality of VMs to the computing device, wherein the VDI controller is communicatively connected to the VM server; obtaining, by the VDI controller based on the login request, user information corresponding to the user and device information corresponding to the computing device; retrieving, by the VDI controller based on the user information, VM information of the VM being assigned to the computing device; and determining, by the VDI controller from a plurality of policies, a specific policy for the user based on the user information, the device information and the VM information, wherein each of the plurality of policies defines permission states of a plurality of functionalities provided by the VM.

In certain embodiments, the functionalities provided by the VM include accessibility of audio redirection, USB redirection, modification of display, network, security, and settings of the computing device to which the VM is assigned.

In certain embodiments, the specific policy for the user is determined by: determining, based on the user information, whether the user is an administrator of the system; and in response to determining the user as the administrator, determining an administrator policy having a highest priority as the specific policy for the user.

In certain embodiments, the device information corresponding to the computing device includes an IP address of the computing device, and the specific policy for the user is determined by: determining, based on the IP address of the computing device, whether the computing device is an internal computing device or an external computing device; in response to determining the computing device as the internal computing device, determining the specific policy for the user based on the user information and the VM information; and in response to determining the computing device as the external computing device, determining the specific policy for the user based on the user information, the VM information, and the IP address of the computing device.

In certain embodiments, the user information further includes group information of the user, wherein the user belongs to at least one of a plurality of pre-defined groups, and the specific policy for the user is determined by: determining, based on the group information of the user, whether the user is a multi-group user belonging to a plurality of the pre-defined groups; and in response to determining that the user is the multi-group user, selecting, from the plurality of policies, a plurality of corresponding policies based on the plurality of the pre-defined groups the user belongs to; and determining the specific policy for the user by selecting one of the corresponding policies having a lowest priority as the specific policy.

Certain aspects of the present disclosure relate to a non-transitory computer readable medium storing computer executable code. In certain embodiments, the computer executable code, when executed at a processor of a VDI controller, is configured to: receive a login request by a user from a computing device; and in response to receiving the login request, authenticate the login request, and control a virtual machine (VM) server to assign one of a plurality of VMs to the computing device, wherein the VDI controller is communicatively connected to the VM server; obtain, based on the login request, user information corresponding to the user and device information corresponding to the computing device; retrieve, based on the user information, VM information of the VM being assigned to the computing device; and determine, from a plurality of policies, a specific policy for the user based on the user information, the device information and the VM information, wherein each of the plurality of policies defines permission states of a plurality of functionalities provided by the VM.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 3 schematically depicts a process of determining of a policy in a system according to certain embodiments of the present disclosure.

DETAILED DESCRIPTION

Figure 1:
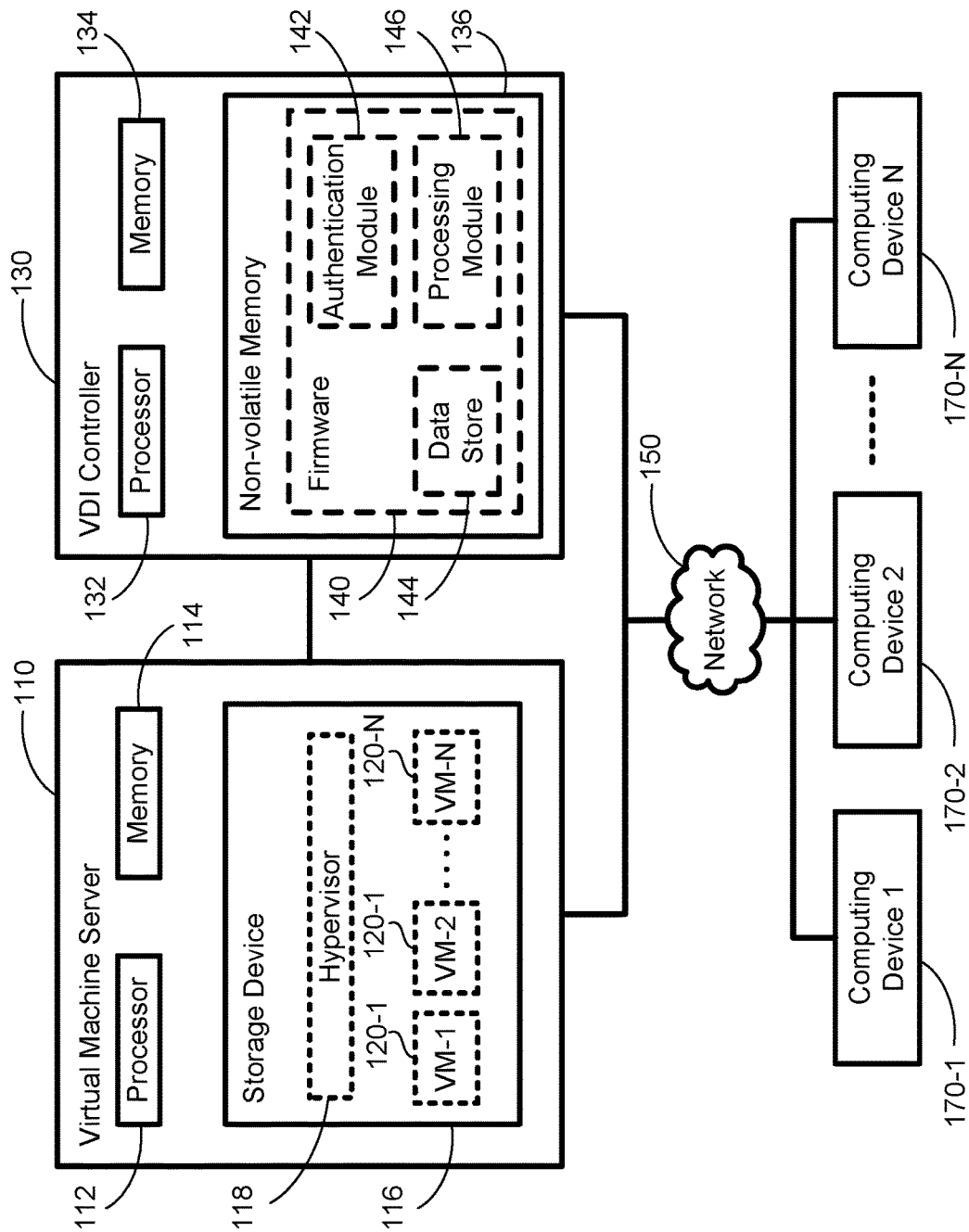
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In accordance with the purposes of present disclosure, as embodied and broadly described herein, in certain aspects, the present disclosure relates to a virtual desktop infrastructure (VDI) system 100. FIG. 1 schematically depicts an exemplary system according to certain embodiments of the present disclosure. As shown in FIG. 1, the VDI system 100 includes: a virtual machine (VM) server 110, a VDI controller 130, a network 150, and one or more computing devices 170. The VM server 110, the VDI controller 130, and the computing devices 170 are communicatively interconnected by the network 150. In certain embodiments, the VM server 110 and the VDI controller 130 may also be connected directly or via an interface, such as a system interface or other interfaces. In certain embodiments, the VDI controller 130 is part of the VM server 110. The network 150 may be a wired or wireless network, and may be of various forms. Examples of the network 150 may include, but not limited to, a local area network (LAN) or wide area network (WAN) including the Internet, or any other type of networks. In certain embodiments, two or more different networks 150 may be applied to connect the VM server 110, the VDI controller 130, and the computing devices 150.

The VM server 110 is a computing device which functions as a server for providing virtual machine services for the VDI system 100. As shown in FIG. 1, the VM server 110 includes a processor 112, a memory 114, and a storage device 116. Further, the storage device 116 of the virtual machine server 110 stores a hypervisor 118 and a plurality of VMs 120, for example VM-1 to VM-N with labels of 120-1 to 120-N.

The processor 112 controls operation of the VM server 110. In certain embodiments, the processor 112 may be a central processing unit (CPU). The processor 112 may execute any computer executable code or instructions. In certain embodiments, the VM server 110 may run on or more than one processor, such as two processors, four processors, eight processors, or any suitable number of processors.

The memory 114 may be a volatile memory, such as the random-access memory (RAM), for storing the data and information during the operation of the VM server 110.

In certain embodiments, the memory 114 may be a volatile memory array. In certain embodiments, the VM server 110 may run on more than one memory 114.

The storage device 116 is a non-volatile data storage media or device for storing the computer executable code of the VM server 110. Examples of the storage device 116 may include flash memory, memory cards, USB drives, or other types of non-volatile storage devices such as hard drives, floppy disks, optical drives, or any other types of data storage devices. In certain embodiments, the VM server 110 may have more than one storage device 116, and the hypervisor 118, the VMs 120 and other applications of the VM server 110 may be stored in the more than one storage device 116 separately.

The hypervisor 118 is a program that allows multiple VM instances to run simultaneously and share a single hardware host, such as the virtual machine server 110. The hypervisor 118, when executed at the processor 112 of the VM server 110 or any other processor, implements hardware virtualization techniques and allows one or more operating systems or other applications to run concurrently as guests of one or more virtual machines on the host server (i.e., the VM server 110). For example, a plurality of users, each from one of the thin clients (e.g., the computing devices 170), may attempt to run operating systems in the VDI system 100. The hypervisor 118 allows each user to run an operating system instance as a VM. In certain embodiments, the hypervisor 118 can be of various types and designs, such as MICROSOFT HYPER-V, XEN, VMWARE ESX, or other types of hypervisors suitable for the VDI system 100.

As shown in FIG. 1, when the hypervisor 118 runs on the virtual machine server 110, the hypervisor instance emulates a virtual computer machine, including a virtual CPU and a virtual memory. A plurality of VM's 120-1 to 120-N can run in the hypervisor 118 as if they are running directly on a physical computer.

The VDI controller 130 is a management controller to control the configuration and validation of the components of the VDI system 100. In certain embodiments, the VDI management controller 130 may be implemented by a service processor (SP) or a baseboard management controller (BMC), which may be located in the VM server 110. The SP or the BMC is a specialized microcontroller that manages the interface between system management software and platform hardware.

It should be noted that the VDI controller 130 is not necessarily implemented by the SP/BMC. In certain embodiments, the VDI controller 130 may be implemented, for example, by the computing device functioning as the VM server 110 or as other servers of the VDI system 100. In this case, the VDI controller 130 may share the hardware and software components of the servers with other software components of the servers to perform certain predetermined tasks. In certain embodiments, the VDI controller 130 may be implemented as a virtual machine by one of the VMs 120 within the VM server 110. In certain embodiments, the VDI controller 130 may be implemented by a separate computing device, which is independent from and not included in the VM server 110 or the computing devices 170 of the VDI system 100.

When the VDI controller 130 is implemented as an independent SP/BMC or computing device, the VDI controller 130 may include necessary hardware and software components to perform certain predetermined tasks. For example, as shown in FIG. 1, the VDI controller 130 includes a processor 132, a memory 134, and a non-volatile memory 136. Further, the VDI controller 130 may include other hardware components and software components (not shown) to perform its corresponding tasks. Examples of these hardware and software components may include, but not limited to, other required memory, interfaces, buses, I/O modules and peripheral devices.

The processor 132 is configured to control operation of the VDI controller 130. In certain embodiments, the processor 132 may be a central processing unit (CPU). The processor 132 can execute any computer executable code or instructions, such as the firmware or other applications of the VDI controller 130. In certain embodiments, the VDI controller 130 may run on more than one processor, such as two processors, four processors, eight processors, or any suitable number of processors.

The memory 134 can be a volatile memory, such as the random-access memory (RAM), for storing the data and information during the operation of the VDI controller 130.

The non-volatile memory 136 is a non-volatile data storage media for storing the firmware 140 and other computer executable code of the VDI controller 130. Examples of the non-volatile memory 136 may include flash memory, memory cards, USB drives, hard drives, floppy disks, optical drives, or any other types of non-volatile data storage devices. The firmware 140 stored in the non-volatile memory 136 includes computer executable code that may be executed at the processor 132. As shown in FIG. 1, the firmware 140 includes an authentication module 142, a data store 144, and a processing module 146.

The authentication module 142 is used to authenticate an identity of a user. Specifically, a user (such as an administrator or any other non-administrator users of the VDI system 100) may operate the computing device 170 to remotely connect to the virtual machine server 110 via the network 150. In certain embodiments, in order to log in to the VM server 110, the user may input a login request, which includes credential information of the user, such as a login name and a password of the user. The computing device 170 may then send the login request to the VM server 110 via the network 150. In response to receiving the login request, the VM server 110 may forward the login request to the VDI controller 130 to perform authentication. When the VDI controller 130 receives the login request, the authentication module 142 is configured to compare the credential information of the user (e.g., the login name and the password) with the user information of all the users stored in the data store 144. If the credential information is successfully authenticated, the user is authorized to be assigned with a VM 120 by the VM server 110, and then execute applications in the VM instance. If the credential information does not match any of the user information stored in the data store 144, authentication may fail, and the authentication module 142 terminates the process.

The data store 144 is a database for storing information of the VDI system 100. In certain embodiments, the information includes information of all of the users of the system 100, including without being limited to, user information corresponding to each of the users, group information corresponding to a plurality of pre-defined groups, VM information corresponding to the VMs, device information corresponding to the computing devices 170, policy information corresponding a plurality of different policies, and rule information corresponding to the rules for determining the policy for each of the users in each login attempt. In certain embodiments, the data store 144 may further store link information to create the links between the above information. For example, a group may be formed by multiple users, and each of the user may belong to one or more groups. Some of the users may be assigned with specific VMs based on the user privilege. Each of the users may have a default computing device that the user typically uses. The link information may be used to create the links between the information.

Figure 2:
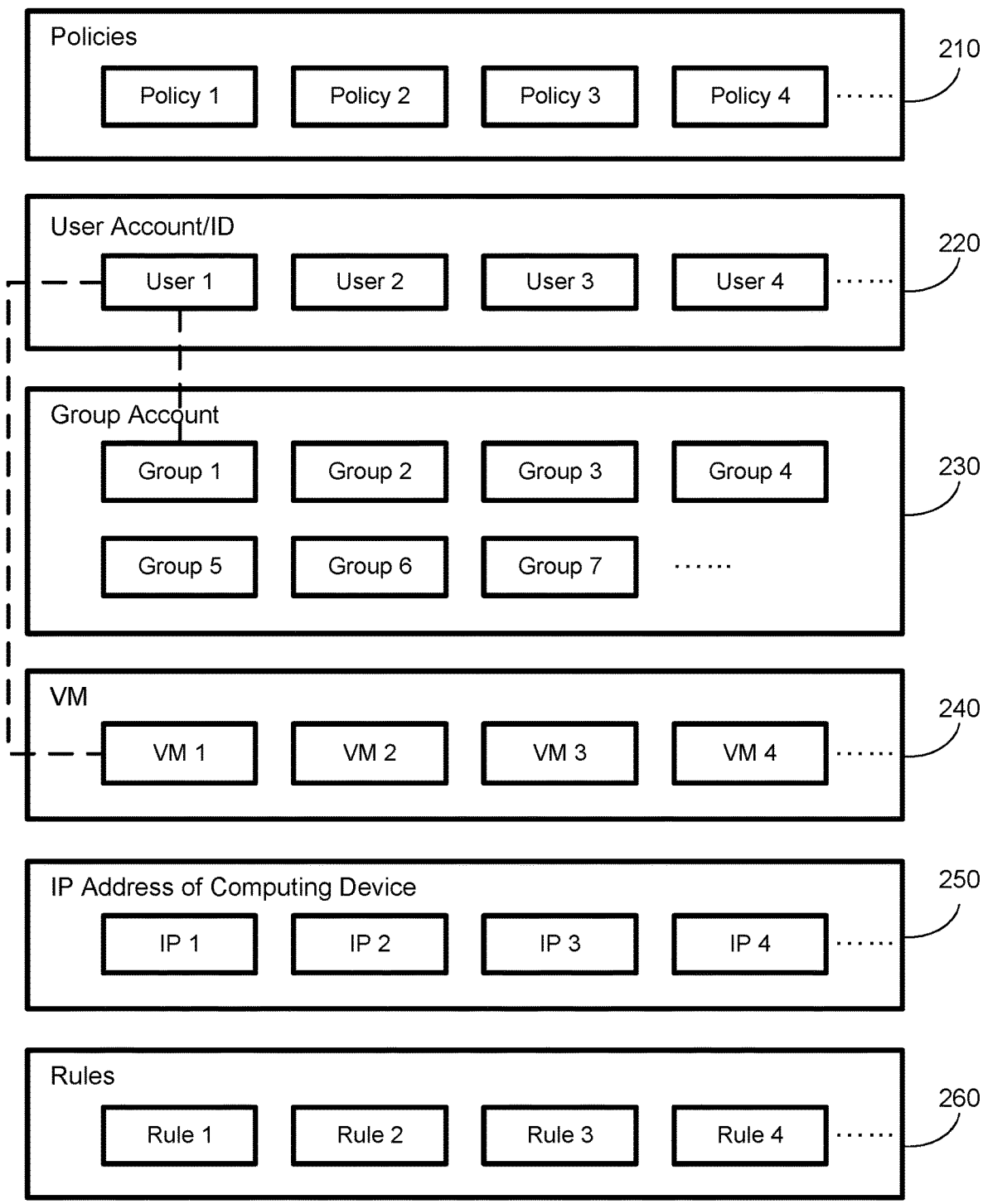
FIG. 2 schematically depicts information stored in a data store according to certain embodiments of the present disclosure.

FIG. 2 schematically depicts information stored in a data store according to certain embodiments of the present disclosure. As shown in FIG. 2, the information stored in the data store 144 may include a plurality of policies 210 as the policy information, a list of user accounts or identifications (IDs) 220 as the user information, a list of pre-defined group accounts 230 as the group information, a list of VMs 240 as the VM information, a list of IP addresses 250 of the computing devices 170 as the device information, and a plurality of rules 260 as the rule information. Further, the link information between the user 1, group 1 and VM 1 is shown in dotted lines as shown in FIG. 2.

In certain embodiments, each of the policies 210 is defined to indicate one or more permission states of a plurality of functionalities provided by the VM. For example, a policy 210, whenever applied to a user operating a specific VM, may define a plurality of permission states of a plurality of functionalities provided by the specific VM. In certain embodiments, the functionalities provided by the VM may include, without being limited to, accessibility of audio redirection, USB redirection, modification of display, network, security, and settings of the computing device to which the VM is assigned. In certain embodiments, the assignment of the policies 210 to the users may be dependent upon the identity of the users (which may be indicated by credential information of the users) and/or the identity of the computing devices used by the users (which may be indicated by information such as the IP address, MAC address, or some other identification information of the computing device).

The list of user accounts or IDs 220 may include the user information of all users of the system 100. As shown in FIG. 2, each user may be assigned with a specific user account or user ID such as, for example, "User 1", "User 2", "User 3", "User 4", etc., as shown in FIG. 2. In certain embodiments, the user information may further include information required for authentication purposes, such as the credential information (e.g., the login name and the password) or other information that may be used to identify the user, such as a domain. Further, the user information for each of the user may be linked to other types of information, such as the policy information, the group information, the VM information, the device information and the rule information. Normally, each user is assigned with a user account. In certain embodiments, a user may be assigned with a few user names corresponding to different work purposes. For example, some of the users, such as the administrator of the system 100, may have a regular user account and a specific administrator account, which enjoy the higher priority than other users of the system 100 in any occasion. In certain embodiments, the user information for some of the users may be linked to one policy of the policies 210. For example, assuming that the users of the systems include, among others, an administrator named Adam and a manager Benjamin. In this case, the administrator Adam's user account may be defined as an administrator account, and is linked to policy 1. The manager Benjamin's user account may be defined as a manager account, and is linked to policy 2.

The list of pre-defined group accounts 230 may include a plurality of pre-defined groups. Each group account may be identified with a group name, a domain, and a password, which is similar to a user account. In certain embodiments, each group may include one or more users. In other words, the link information between the user information 220 and the group information 230 may define the group (or groups) each user belongs to. In certain embodiments, the groups may be pre-defined based on the nature of the system 100. For example, "Group 1" may be an administrator group account, "Group 2" may be a manager group account, "Group 3" may be a developer group account, "Group 4" may be a technical support account, "Group 5" may be a marketing group account, "Group 6" may be a regular user group account, and "Group 7" may be a guest group account. Each group account may be linked to one policy of the policies 210. Further, a user may be assigned to multiple groups. For example, the administrator Adam may be assigned to "Group 1" as an administrator who is administrating the computing system, and also assigned to "Group 3" as a developer who performs R & D in developing software applications. The user Benjamin is assigned to "Group 2" as a manager who is one of the managers in the company, and also assigned to "Group 4" who is responsible for technical support.

The list of VMs 240 refers to all the type of VMs available in the virtual machine server 110. In certain embodiments, the VMs may have the same or different privileges, and may be assigned to a specific user. For example, VM 1 may be assigned to the administrator who has the highest privilege. Other VMs may be assigned to the managers, developers, and other employees of the company. In certain embodiments, a VM with the basic functionalities, without being assigned to any of the existing users of the system 100, may be reserved for the guests.

The list of IP address 250 includes the IP addresses of all the computing devices 170 for connecting to VMs of the system 100. It should be noted that the computing devices 170, with the IP addresses being recorded in the data store 144, may be the "internal" computing devices 170 of the system 100. In certain embodiments, a user may use an "external" computing device, such as a tablet, a laptop, a portable device, or any other computing device capable of connecting to the VM server 110, to access the VMs and perform redirection to the VM provided by the VM server 110. In this case, the IP address of the external computing device may not be recorded in the list of IP addresses 250, and the policy being applied to the user using the external computing device may be different from the regular policy being applied to the user using an internal computing device 170.

The rule information 260 includes rules for determining the policy for each of the users in each login attempt. In certain embodiments, the rules for determining the policy for each user may involve a combination of the user information, the group information, the VM information, the device information and the policy information. For example, one of the rules may be the "administrator rule," which involves the administrator of the system 100. In this case, if the user is confirmed to be an administrator of the system 100, the user is assigned with a specific policy (e.g., Policy 1) regardless of the group (or groups) the user belongs to, the computing device the user used for login, etc. In other words, such rule ensures that the administrator of the system 100 may enjoy the pre-defined administrator policy (which has the highest level of priority) as the specific policy for the user.

In another example, a "guest rule" may apply to the guest user of the system. In this case, if the user is confirmed to be a guest, he is assigned with a specific policy (e.g., Policy 6), regardless of the group (or groups) the user belongs to, the computing device the user used for login, etc. In other words, such rule ensures that the guest of the system 100 may only enjoy the pre-defined guest policy (which has the lowest level of priority) as the specific policy for the user.

A further example may be a "device matters" rule, which involves the computing device 170 being used by the user. In this case, if a user uses an internal computing device 170 (i.e., the IP address of the computing device 170 being recorded in the data store 144) to connect to the system 100, the specific policy for the user may be determined based on the user information and the VM information, without involving the device information. On the other hand, if a user uses an external computing device to connect to the system 100, the specific policy for the user may be determined based on the user information, the VM information, and the IP address of the computing device. In other words, the device information matters only when the computing device 170 being used is an external computing device.

In a different example, a "lower policy applies" rule may involve a user corresponding to multiple policies. In this case, if a user may be assigned with a plurality of different corresponding policies with different levels of priority, the policy of the user may be determined by selecting one of the corresponding policies that has a lowest priority as the specific policy for the user. For example, if a user belongs to two or more groups, and each of the two or more groups corresponds to a different policy with a different level of priority, the policy of the user may be determined based on the group information, and for all of the groups that the user belongs to, the group that corresponds to a policy with the lowest priority among the different policies will be selected for determination of the specific policy for the user.

In certain embodiments, each of the rules may have different priorities. For example, some rules may have a higher priority than any other rules.

It should be particularly noted that the mapping of the policies based on the user information, the group information, the VM information and the device information may vary. For example, in certain embodiments, a user may be mapped to a corresponding policy. In other embodiments, the user may not be mapped to a policy, while the groups may be mapped to corresponding policies. The user may be determined with a corresponding policy by the group he or she belongs to. In certain embodiments, when a user belongs to two or more groups and the two or more groups correspond to two or more policies, the "lower policy applies" rule may apply to the user, such that the user is assigned with a policy that has the lowest priority. In certain embodiments, when a user belongs to two or more groups and none of the two or more groups are mapped to any policy, the user is assigned with a lowest policy in the policy list, for example, the guest policy (e.g., Policy 6).

The processing module 146 is a module configured to determine the policy for the user. In certain embodiments, after the login request from a computing device 170 is authenticated by the authentication module 142, the processing module 146 may obtain, based on the login request, user information corresponding to the user and device information corresponding to the computing device. Then, the processing module 146 may use the user information and the device information to search for the data store 144, and retrieve group information of the user and VM information of the VM being assigned to the computing device 170. In this case, the processing module 146 may control the VM server 110 to assign the selected VM to the computing device 170. Once the processing module 146 obtains and retrieves the necessary information (such as the user information, the group information, the VM information and the device information, the processing module 146 may retrieve the rule information from the data store 144, and determine, from the multiple policies, a specific policy for the user based on the information and the rules.

The computing device 170 is remote computing device communicatively connected to the virtual machine server 110 and the VDI controller 130 via the network 150. In certain embodiments, the VDI system 100 may include more than one computing device 170, and each of the one or more computing devices 170 may be respectively connected to the virtual machine server 110 and the VDI controller 130 via the network 150. In certain embodiments, the computing device 170 may be a general purpose computer, a specialized computer, a server, a mobile device such as a laptop computer, a smartphone or a tablet, a management controller, a system-on-chip (SOC), or any other types of computing devices. The computing device 170 may include, without being limited to, a processor, a memory, and a storage device. In certain embodiments, the computing device 170 may include other hardware components and software components (not shown) to perform its corresponding tasks. Examples of these hardware and software components may include, but not limited to, other required memory, interfaces, buses, Input/Output (I/O) modules and peripheral devices. As described above, the computing device 170 may be an "internal" computing device if the IP address of the computing device 170 is recorded in the data store 144 of the VDI controller 130, or an "external" computing device if the IP address of the computing device 170 is not recorded in the data store 144 of the VDI controller 130.

FIG. 3 schematically depicts a process of determining of a policy in a system according to certain embodiments of the present disclosure. In certain embodiments, the process as shown in FIG. 3 may be implemented on a system 100 as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 305, a user at one of the computing devices 170 may send a login request to the authentication module 142 of the VDI controller 130 via the network 150. It should be noted that the login request may not be sent directly from the computing device 170 to the VDI controller 130. For example, the computing device 170 may send the login request to the VM server 110, and the VM server 110 forwards the login request to the VDI controller 130. In certain embodiments, the login request includes the credential information of the user, such as a login name and a password for authentication purposes. In certain embodiments, the login request may be entered manually by the user on the computing device 170. Alternatively, in certain embodiments, the login request may be automatically generated by an application when the user executes the application on the computing device 170.

Upon receiving the login request from the computing device 170, at procedure 310, the authentication module 142 accesses the data store 144 to retrieve corresponding authentication information from the data store 144. The authentication information may include a list of the credential information of all the users of the system 100. At procedure 315, the authentication module 142 performs the authentication process based on the information of the login request and the authentication information retrieved from the data store 144. In certain embodiments, the authentication module 142 compares the credential information of the login request to the authentication information retrieved from the data store 144. If the credential information matches with the authentication information, the login request is successfully authenticated. If the credential information does not match any of the authentication information recorded, authentication may fail, and the authentication module 142 terminates the process.

Once the authentication process is passed, at procedure 320, the authentication module informs the processing module 146 that the authentication is passed, and that the processing module 146 may start the policy determination process.

Upon receiving the information that the authentication is passed, at procedure 325, the processing module 146 obtains the information of the user from the data store 144. The information may include the user information, the group information, the VM information and the device information. Further, the processing module 146 also retrieves the rule information from the data store 144. Once the information has been obtained, at procedure 330, the processing module 146 determines, from the policies, a specific policy for the user based on the information obtained (e.g., the user information, the group information, the VM information and the device information) and the rules. At procedure 335, the processing module 146 controls the VM server 110 to launch the VM 120 for the user based on the policy being determined. In this case, the user at the computing device 170 may operate the VM based on the policy, and the user may have access to the functionalities provided by the VM based on the permission states of the policy.

The policy determination process may be further explained using Adam the administrator and Benjamin the manager as two examples. In certain embodiments, the user Adam may send a login request from a tablet using his credential information (e.g., login name and password) as the administrator. Once the authentication module 142 receives the login request, the login request will be successfully authenticated. Then the processing module 146 retrieves Adam's information based on the information provided in the login request, and then determines the specific policy for Adam. Since Adam's user information will indicate that Adam is an administrator, the administrator rule applies, and Adam will be assigned with the policy that has the highest level of priority of the system 100. Since the administrator rule applies, the processing module 146 may disregard other information, such as the device information.

In another example, the user Benjamin sends a login request from a newly purchased smartphone using his credential information (e.g., login name and password) as the manager. Once the authentication module 142 receives the login request, the login request will be successfully authenticated. Then the processing module 146 retrieves Benjamin's information based on the information provided in the login request, and then determines the specific policy for Benjamin. In this case, since Benjamin uses a newly purchased smartphone to connect to the system 100, there will be no device information recorded in the data store 144 of the VDI controller 130 for this smartphone. Thus, the processing module 146 may determine the specific policy for Benjamin based on the user information, the group information, the VM information and the device information (i.e., an IP address of the smartphone). For example, Benjamin belongs to Group 2, which is the group for the managers. In this case, Benjamin (and all the other managers) should generally be assigned with a Policy 2 authority. At the same time, since Benjamin is using an external computing device (i.e., the new smartphone), Benjamin may not enjoy his regular Policy 2 because the new smartphone is unrecognizable by the VDI controller 130. Thus, Benjamin may be assigned with a policy having a lower level of priority, such as a Policy 6, which corresponds to the authority of a guest.

Figure 4A:
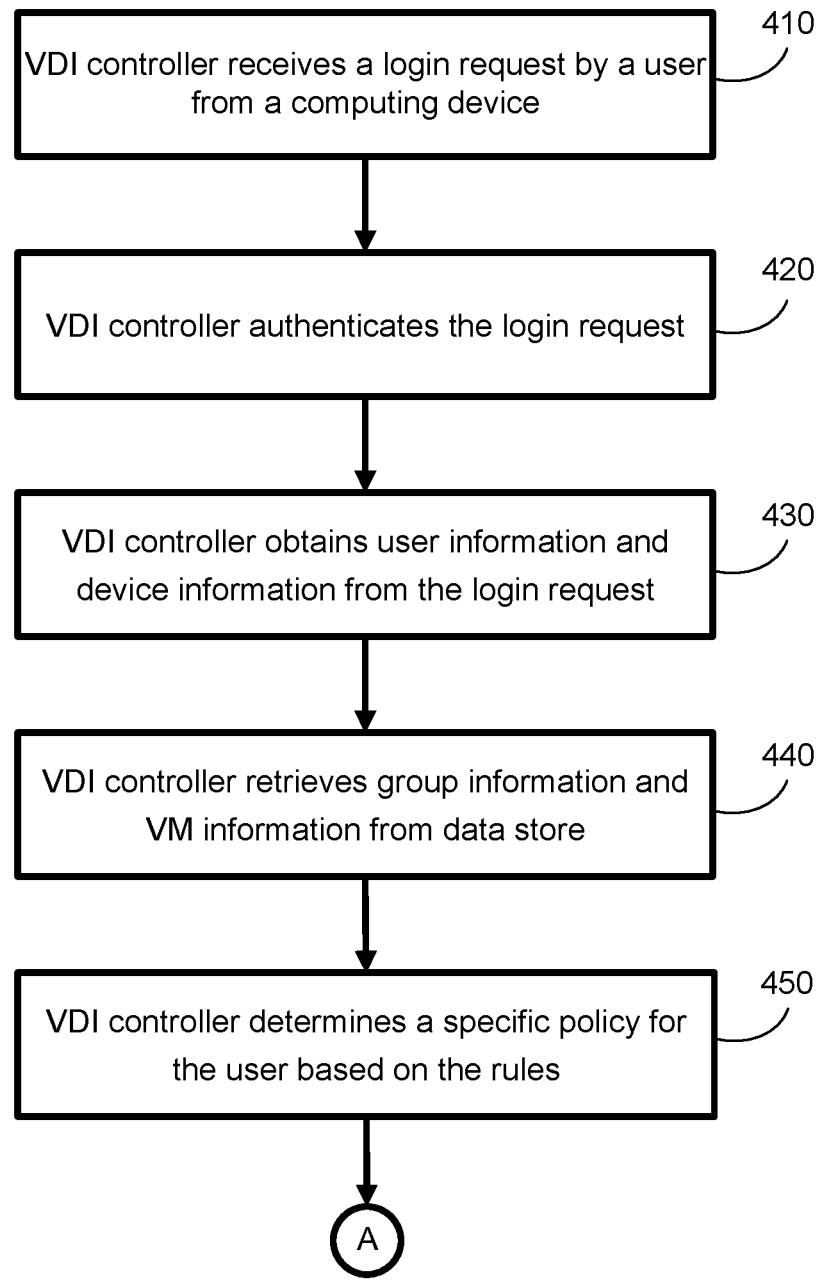
FIGS. 4A and 4B schematically depicts a flowchart of a method to determine a policy application in a VDI according to certain embodiments of the present disclosure.
Figure 4B:
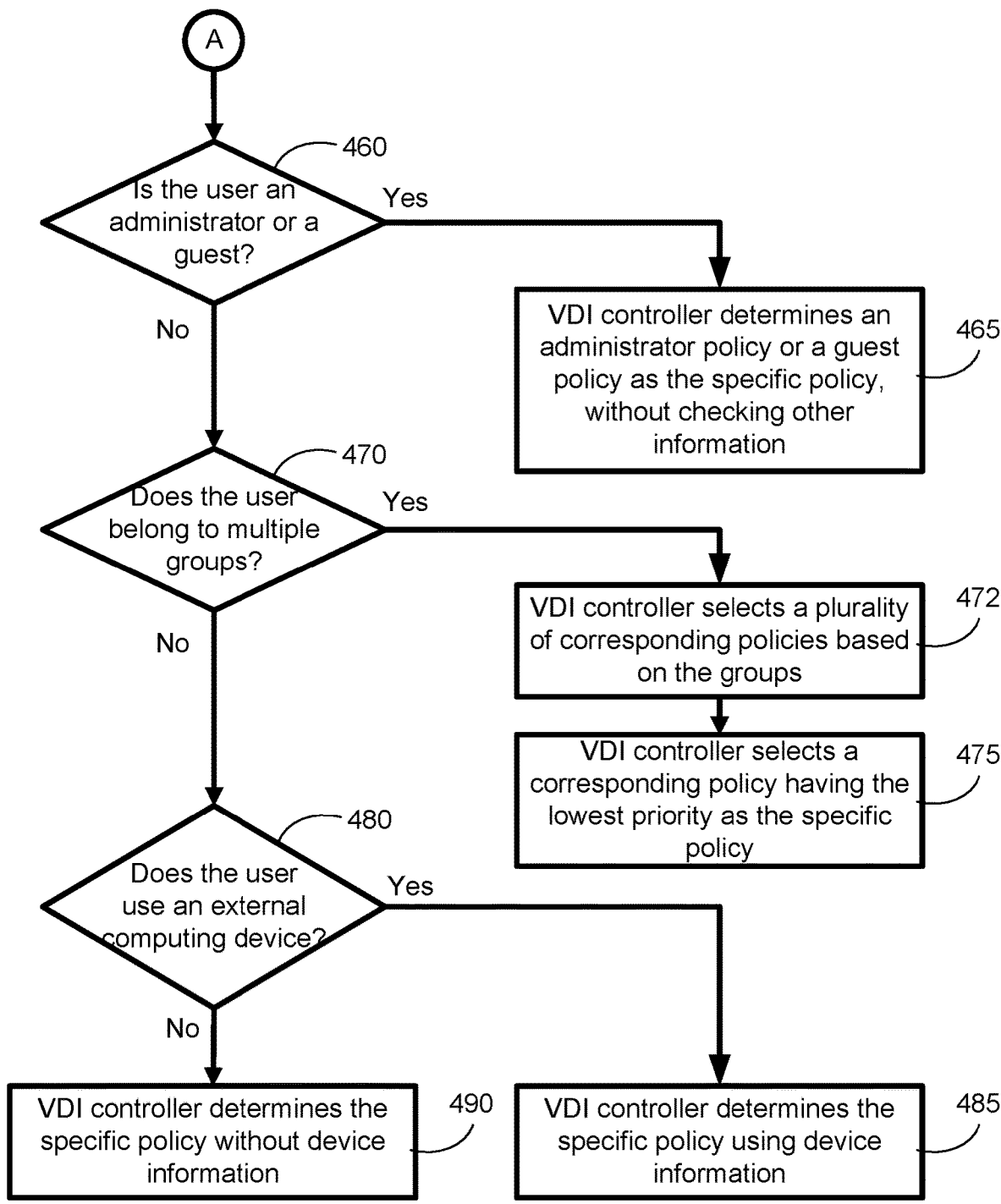

A further aspect of the present disclosure is directed to a method for determining a policy in a VDI system. FIGS. 4A and 4B schematically depicts a flowchart showing a method of determining a policy in a VDI system according to certain embodiments of the present disclosure. In certain embodiments, the method as shown in FIGS. 4A and 4B may be implemented on a system as shown in FIG. 1. It should be particularly noted that, unless otherwise stated in the present disclosure, the steps of the method may be arranged in a different sequential order, and are thus not limited to the sequential order as shown in FIGS. 4A and 4B.

As shown in FIG. 4A, at procedure 410, the VDI controller 130 receives a login request by a user from a computing device 170. In certain embodiments, the login request may include credential information of the user. At procedure 420, in response to receiving the login request, the VDI controller 130 authenticates the login request. In certain embodiments, if the credential information of the login request cannot be successfully authenticated, the VDI controller 130 will terminate the process.

In certain embodiments, the VDI controller 130 obtains the user information and compares the user name and the password in the login request with the user names and corresponding passwords stored in the VDI management controller 130 to confirm if the login request is valid. If the user name and the password matches one record of the user name and password stored in the VDI management controller 130, the login request is confirmed. Otherwise, the authenticates fails and the process terminates.

Once the authentication process is successfully performed, at procedure 430, the VDI controller 130 obtains the user information (e.g., a user account or a user ID) and the device information (e.g., IP address of the computing device 170) from the login request. At procedure 440, the VDI controller 130 retrieves the group information and the VM information from the data store 144. Once all of the information is obtained or retrieved, at procedure 450, the VDI controller may determine a specific policy for the user based on the rules.

Referring now to FIG. 4B, a plurality of rules may apply in determination of the specific policy for the user. For example, at procedure 460, the VDI controller 130 determines if the user is an administrator or a guest. If so, at procedure 465, the VDI controller 130 may determine an administrator policy or a guest policy as the specific policy for the user, without checking other information, such as the group information, the VM information, and the device information.

At procedure 470, the VDI controller 130 determines if the user belongs to multiple groups. If so, at procedure 472, the VDI controller 130 selects a plurality of corresponding policies based on the groups, and at procedure 475, the VDI controller 130 may select one of the corresponding policies having the lowest priority as the specific policy for the user.

At procedure 480, he VDI controller 130 determines if the user uses an external computing device 170 to connect to the system 100. If so, at procedure 485, the VDI controller 130 determines the specific policy for the user using the device information (e.g., the IP address of the computing device 170). On the other hand, if the computing device 170 being used by the user is an internal computing device, at procedure 490, the VDI controller 130 may determine the specific policy for the user without the device information.

Once the specific policy for the user is determined, the VDI controller 130 may control the VM server to assign the VM to the computing device, such that a VM session is launched for the user at the computing device 170 to operate the VM under the policy.

As described above, the above procedures may be performed in any order, for example, sequentially, or in parallel, or independent from each other. For example, the arrangement of the rules being applied in the procedures 460 to 490 may be performed in a different order if different rules apply. In certain embodiments, at least one of the procedures is optional.

In another aspect, the present disclosure relates to a non-transitory computer readable medium storing computer executable code. In certain embodiments, the computer executable code may be the firmware stored in the non-volatile memory 136 of the VDI controller 130 as described above. The computer executable code, when being executed, may perform one of the methods described above. In certain embodiments, the non-transitory computer readable medium may include, but not limited to, the non-volatile memory 136 of the VDI management controller 130 as described above, or any other storage media of the VDI management controller 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a virtual machine (VM) server providing a plurality of VMs; and
a virtual desktop infrastructure (VDI) controller communicatively connected to the VM server, wherein the VDI controller comprises a processor and a non-volatile memory storing computer executable code, wherein the computer executable code, when executed at the processor, is configured to:
receive a login request by a user from a computing device; and
in response to receiving the login request,
authenticate the login request, and control the VM server to assign one of the VMs to the computing device;
obtain, based on the login request, user information corresponding to the user and device information corresponding to the computing device, wherein the device information corresponding to the computing device comprises an internet protocol (IP) address of the computing device;
classify the computing device as an internal computing device or an external computing device by comparing the IP address of the computing device to an IP address list, wherein the computing device is classified as the internal computing device when the IP address of the computing device is on the IP address list, and the computing device is classified as the external computing device when the IP address of the computing device is not on the IP address list;
retrieve, based on the user information, VM information of the VM being assigned to the computing device from a data store in the non-volatile memory of the VDI controller; and
determine, from a plurality of policies, a specific policy for the user based on all of the user information, the device information, and the VM information and the computing device being classified as the internal computing device or the external computing device, wherein each of the plurality of policies defines permission states of a plurality of functionalities provided by the VM,
wherein the computer executable code is configured to determine the specific policy for the user by:
in response to determining the computing device as the internal computing device, determining the specific policy for the user based on the user information and the VM information; and
in response to determining the computing device as the external computing device, determining the specific policy for the user based on the user information, the VM information, and the IP address of the computing device.

2. The system of claim 1, wherein the login request comprises a login name and a password of the user.

3. The system of claim 1, wherein the user information comprises a user account or a user identification corresponding to the user.

4. The system of claim 1, wherein the functionalities provided by the VM comprise accessibility of audio redirection, USB redirection, modification of display, network, security, and settings of the computing device to which the VM is assigned.

5. The system of claim 1, wherein the computer executable code is configured to further determine the specific policy for the user by:
determining, based on the user information, whether the user is an administrator of the system; and
in response to determining the user as the administrator, determining an administrator policy having a highest priority as the specific policy for the user.

6. The system of claim 1, wherein the internal computing device is a thin client computing device connected to the VM server, and the external computing device is a tablet, a laptop, or a portable device capable of performing redirection to the VM provided by the VM server.

7. The system of claim 1, wherein the user information further comprises group information of the user, wherein the user belongs to at least one of a plurality of pre-defined groups.

8. The system of claim 7, wherein the computer executable code is configured to further determine the specific policy for the user by:
   determining, based on the group information of the user, whether the user is a multi-group user belonging to a plurality of the pre-defined groups; and
   in response to determining that the user is the multi-group user,
      selecting, from the plurality of policies, a plurality of corresponding policies based on the plurality of the pre-defined groups the user belongs to; and
      determining the specific policy for the user by selecting one of the corresponding policies having a lowest priority as the specific policy.

9. A method for determining a policy for a user in a virtual desktop infrastructure (VDI) system, the method comprising:
   receiving, by a VDI controller, a login request by a user from a computing device; and
   in response to receiving the login request,
      authenticating, by the VDI controller, the login request, and controlling a virtual machine (VM) server to assign one of a plurality of VMs to the computing device, wherein the VDI controller is communicatively connected to the VM server;
      obtaining, by the VDI controller based on the login request, user information corresponding to the user and device information corresponding to the computing device, wherein the device information corresponding to the computing device comprises an internet protocol (IP) address of the computing device;
      classifying, by the VDI controller, the computing device as an internal computing device or an external computing device by comparing the IP address of the computing device to an IP address list, wherein the computing device is classified as the internal computing device when the IP address of the computing device is on the IP address list, and the computing device is classified as the external computing device when the IP address of the computing device is not on the IP address list;
      retrieving, by the VDI controller based on the user information, VM information of the VM being assigned to the computing device from a data store in the VDI controller; and
      determining, by the VDI controller from a plurality of policies, a specific policy for the user based on all of the user information, the device information, and the VM information and the computing device being classified as the internal computing device or the external computing device, wherein each of the plurality of policies defines permission states of a plurality of functionalities provided by the VM,
   wherein the specific policy for the user is determined by:
      in response to determining the computing device as the internal computing device, determining the specific policy for the user based on the user information and the VM information; and
      in response to determining the computing device as the external computing device, determining the specific policy for the user based on the user information, the VM information, and the IP address of the computing device.

10. The method of claim 9, wherein the functionalities provided by the VM comprise accessibility of audio redirection, USB redirection, modification of display, network, security, and settings of the computing device to which the VM is assigned.

11. The method of claim 9, wherein the specific policy for the user is further determined by:
   determining, based on the user information, whether the user is an administrator of the system; and
   in response to determining the user as the administrator, determining an administrator policy having a highest priority as the specific policy for the user.

12. The method of claim 9, wherein the user information further comprises group information of the user, wherein the user belongs to at least one of a plurality of pre-defined groups, and the specific policy for the user is further determined by:
   determining, based on the group information of the user, whether the user is a multi-group user belonging to a plurality of the pre-defined groups; and
   in response to determining that the user is the multi-group user,
      selecting, from the plurality of policies, a plurality of corresponding policies based on the plurality of the pre-defined groups the user belongs to; and
      determining the specific policy for the user by selecting one of the corresponding policies having a lowest priority as the specific policy.

13. A non-transitory computer readable medium storing computer executable code, wherein the computer executable code, when executed at a processor of a virtual desktop infrastructure (VDI) controller, is configured to:
   receive a login request by a user from a computing device; and
   in response to receiving the login request,
      authenticate the login request, and control a virtual machine (VM) server to assign one of a plurality of VMs to the computing device, wherein the VDI controller is communicatively connected to the VM server;
      obtain, based on the login request, user information corresponding to the user and device information corresponding to the computing device, wherein the device information corresponding to the computing device comprises an internet protocol (IP) address of the computing device;
      classify the computing device as an internal computing device or an external computing device by comparing the IP address of the computing device to an IP address list, wherein the computing device is classified as the internal computing device when the IP address of the computing device is on the IP address list, and the computing device is classified as the external computing device when the IP address of the computing device is not on the IP address list;
      retrieve, based on the user information, VM information of the VM being assigned to the computing device from a data store in a non-volatile memory of the VDI controller; and
      determine, from a plurality of policies, a specific policy for the user based on all of the user information, the device information, and the VM information and the computing device being classified as the internal computing device or the external computing device, wherein each of the plurality of policies defines permission states of a plurality of functionalities provided by the VM,
   wherein the computer executable code is configured to determine the specific policy for the user by:

in response to determining the computing device as the internal computing device, determining the specific policy for the user based on the user information and the VM information; and in response to determining the computing device as the external computing device, determining the specific policy for the user based on the user information, the VM information, and the IP address of the computing device.

14. The non-transitory computer readable medium of claim 13, wherein the functionalities provided by the VM comprise accessibility of audio redirection, USB redirection, modification of display, network, security, and settings of the computing device to which the VM is assigned.

15. The non-transitory computer readable medium of claim 13, wherein the computer executable code is configured to determine the specific policy for the user by:

determining, based on the user information, whether the user is an administrator of the system; and in response to determining the user as the administrator, determining an administrator policy having a highest priority as the specific policy for the user.

16. The non-transitory computer readable medium of claim 13, wherein the user information further comprises group information of the user, wherein the user belongs to at least one of a plurality of pre-defined groups, and the computer executable code is configured to further determine the specific policy for the user by:

determining, based on the group information of the user, whether the user is a multi-group user belonging to a plurality of the pre-defined groups; and in response to determining that the user is the multi-group user, selecting, from the plurality of policies, a plurality of corresponding policies based on the plurality of the pre-defined groups the user belongs to; and determining the specific policy for the user by selecting one of the corresponding policies having a lowest priority as the specific policy.

17. The system of claim 1, wherein the VDI controller is a baseboard management controller (BMC).

* * * * *